United States Patent [19]

Reid

[11] 4,123,933
[45] Nov. 7, 1978

[54] METHOD FOR MEASURING AXLE DEFLECTION

[75] Inventor: Paul A. Reid, Mentor, Ohio

[73] Assignee: Towmotor Corporation, Mentor, Ohio

[21] Appl. No.: 873,044

[22] Filed: Jan. 27, 1978

[51] Int. Cl.² .................. G01B 7/18; G01G 19/12
[52] U.S. Cl. ........................... 73/855; 177/136; 177/211
[58] Field of Search ............ 73/88.5 R; 177/136, 177/211

[56] References Cited

U.S. PATENT DOCUMENTS 3,443,652  5/1969  Videon ............................. 177/136
3,650,340  3/1972  Bradley ........................... 177/136
3,800,895  4/1974  Gale et al. ....................... 177/136
3,889,767  6/1975  Scott et al. ...................... 177/136

FOREIGN PATENT DOCUMENTS 1,420,110  1/1976  United Kingdom ............... 177/136

Primary Examiner—Charles A. Ruehl
Attorney, Agent, or Firm—John L. James

[57] ABSTRACT

A method for sensing a change in deflection of an axle due to load is provided by attaching a deflection sensing device at a specific longitudinal location along the axle at which the bending moment is not affected by a stop member contacting the axle. The stop member limits pivotal movement of the axle.

5 Claims, 4 Drawing Figures

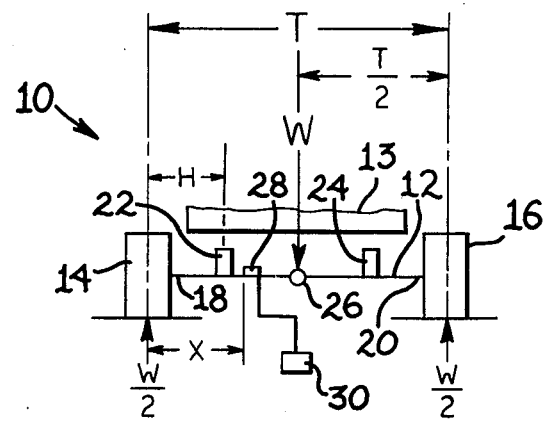
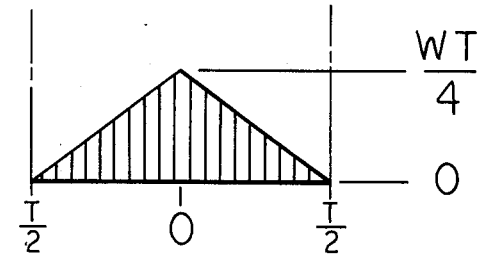
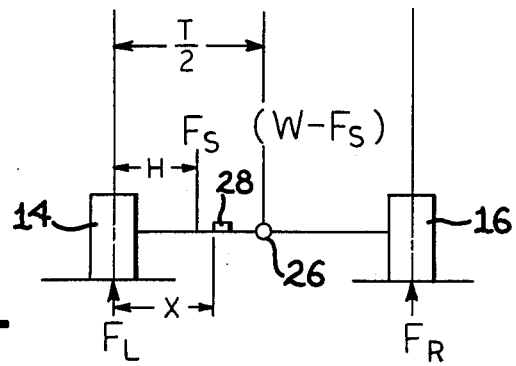
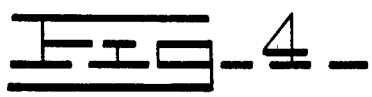
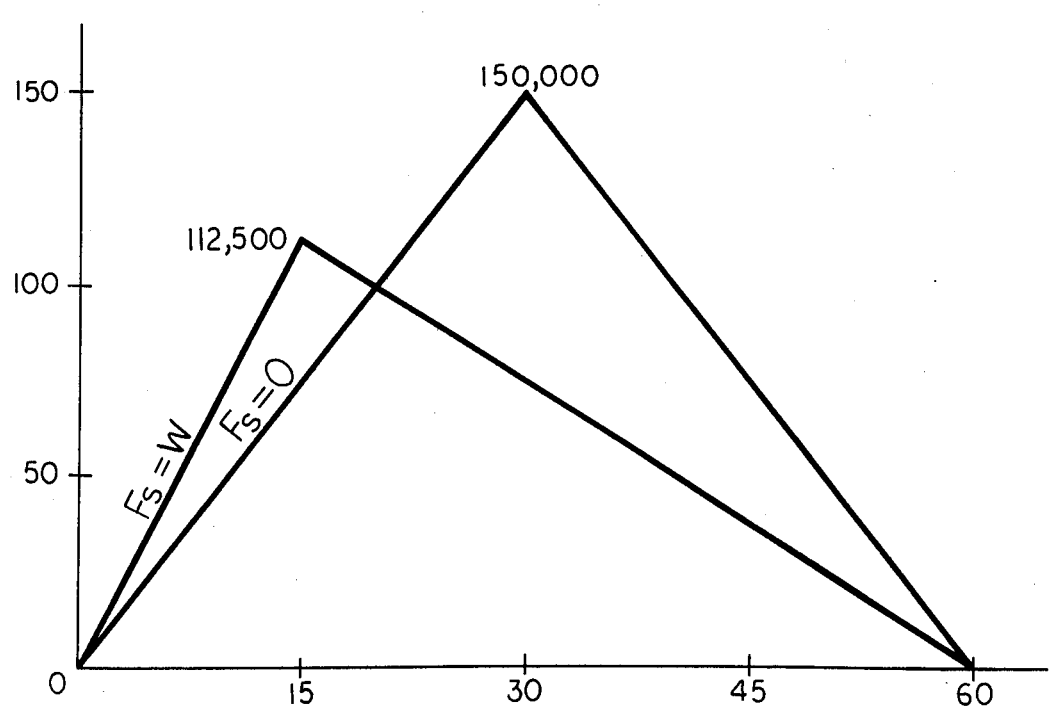

METHOD FOR MEASURING AXLE DEFLECTION

BACKGROUND OF THE INVENTION

Work vehicles, such as fork lift trucks, experience longitudinal instability when overloaded or improperly loaded. A lift truck, for example, experiences longitudinal instability when attempting to lift a load which is too heavy and when traveling over a rough or uneven pathway. When overloaded, the lift truck tends to pivot about the front axle and the rear-mounted steering axle sometimes leaves the roadway.

An increase in load placed upon the front mounted forks results in a decrease in deflection of the rear mounted steer axle. Thus steer axle deflection is useful as an indication of the load condition of the lift truck. A deflection sensing device is used to monitor steer axle deflection and indicate the load condition of the lift truck.

A stop member is mounted on each side of the lift truck between the body or frame and the steer axle. The frame and axle contact one of the stops when the lift truck operates on a sufficiently rough pathway and limits pivotal motion of the axle toward the vehicle frame. Axle deflection is decreased when the stop is contacted giving the false impression that the lift truck is overloaded.

It is desirable to sense impending longitudinal instability to prevent damage to the lift truck or materials being handled. This sensing is desirable to prevent operation with a greater load when a stop is contacted than when not and is realized only when the sensing device is positioned at the location where the deflection moment of the axle is not affected by the stop member contacting the axle.

SUMMARY OF THE INVENTION

The present invention is directed to overcoming one or more of the problems as set forth above.

According to the present invention, a method for sensing the deflection of a pivotal axle which is limited in pivotal movement by a stop member is provided by attaching a deflection sensing device to a preselected side of the axle about a preselected longitudinal location relative to the length of the axle wherein the axle deflection is substantially independent of the force exerted by the stop member on the axle and connecting an indicating device to the deflection sensing device.

BRIEF DESCRIPTION OF THE DRAWINGS

FIG. 1 is a diagrammatic view of a steer axle of a lift truck;

FIG. 2 is a load moment diagram for the steer axle of FIG. 1;

FIG. 3 is a force diagram for the steer axle of FIG. 1; and

FIG. 4 is a load moment diagram for the force diagram of FIG. 3.

DETAILED DESCRIPTION

Referring to FIG. 1, a lift truck 10 has a steer axle 12 and left and right wheels 14, 16 connected to left and right ends 18, 20 of the axle 12, respectively. Stop members 22, 24 are connected to the axle 12 or frame 13 of the lift truck 10 preferably the axle 12. The axle 12 has a center point 26. One skilled in the art will recognize that the lift truck 10 pivots about the center point 26 toward the frame 13 until one of the stops 22, 24 is contacted.

The distance between the centers of the wheels 14, 16 is "T" and the distance from either wheel center to the center point 26 is "T/2". The distance between the center of either wheel 14, 16 and the respective stop member 22, 24 is denoted "H". The distance between the center of either wheel 14, 16 and a deflection sensing means, such as a strain gauge 28, is denoted "X". The proportion of the load and weight of the lift truck acting through the center point 26 when neither stop 22, 24 is contacted is "W". The force in pounds force at each wheel 14, 16 when the lift truck 10 is in static equilibrium is approximately W/2.

Referring to FIG. 2, the sum of the bending moments of the axle 12 about the center point 26 is as shown, increasing from zero at the center of each wheel 14, 16 to a maximum of WT/4 at the center point 26. The strain sensed by a strain guage 28, is proportional to the bending moment at the location of the strain gauge 28, when the stops 22, 24 are not contacted. When a stop 22 is contacted, the bending moment changes and is not uniform. Thus the location of the strain gauge 28 is critical because the strain gauge 28 must not be affected by the stop members 22, 24.

Referring to FIG. 3, a force $F_S$ is applied to the axle 12 at the left stop 18, for example, as shown when the left stop 22 contacts the axle 12 and frame 13. Such contact is made when the lift truck 10 operates on a rough pathway and the axle 12 pivots about the center point 26 toward the frame 13. The force W which is first applied to the center point 26 and then to the left stop 22 is reduced at the center point 26 by an amount equal to $F_S$. The forces at the left and right tires $F_L$, $F_R$ are no longer equal to W/2 because static equilibrium requires that the force $F_L$ at the wheel 14 next to the left stop be increased and the force $F_R$ at the right wheel 16 be decreased equally.

Thus, the sum of the moments about the center point 26 of the axle 12 is zero and:

$$F_L T/2 - F_S(T/2 - H) = F_R T/2$$

$$F_L - F_S(1 - 2H/T) = F_R$$

wherein $F_L$ and $F_R$ are forces at the left and right wheels 14, 16, respectively, in pounds force, and T and H are in inches.

Since the weight W is the total force applied to the axle 12 in pounds force, $W = F_L + F_R$. Substituting $F_L = W - F_R$ and $F_R = W - F_L$ in the equations above and solving for $F_L$ and $F_R$ yields the forces $F_L$ and $F_R$ at the wheels 14, 16 when the left stop is contacted:

$$F_R = W/2 - F_S/2 + F_S H/T \text{ and}$$

$$F_L = W/2 + F_S/2 - F_s H/T$$

Referring to FIG. 4, the moment at each wheel 14, 16 is still zero when either stop 22, 24 is contacted. The moment at the center point 26 when the left stop is contacted is:

$$F_R(T/2) = (W/2 - F_S/2 + F_S H/T) T/2.$$

The moment at the left stop is $F_L(H) = (W/2 + F_S/2 - F_S H/T)H$.

The moment diagram for various values of stop force $F_S$ shows that there is a location on the axle 12 where the moment is independent of the stop force $F_S$. When $F_S = 0$, the stop 22 is not contacted and when $F_S = W$, all the weight is carried by the stop 22.

The location of the point "X" on the axle 12 where the moment is independent of the stop force $F_S$ is determined by equating the moments for the contact and no contact conditions at X. For the non-contact condition the moment is WX/2 and for the contact condition the moment is $F_L(X)$ less $F_S(X-H)$ or $(W/2 - F_SH/T)X - F_S(X-H)$. Equating the two yields:

$$WX/2 = WX/2 + F_SX(1 - H/T) - F_S(X-H) \text{ and}$$
$$X = 2TH/(2H+T)$$

Thus X is the distance from the wheel 14 to the critical point on the axle 12 where the moment is independent of the stop force $F_S$.

A method for sensing a change in the deflection of the axle 12 wherein pivotal movement of the axle 12 toward the frame 13 is limited by the stop members 22, 24 is provided by attaching the strain gauge 28 to a preselected side of the axle 12 about a preselected longitudinal location relative to the length of the axle 12 and connecting an indicating device 30 to the strain gauge 28. The preselected location is defined by the equation $X = 2TH/(2H+T)$.

The strain gauge 28 is located inboard of X, preferably between X and the center point 26 of the axle 12. The strain gauge 28 is preferably connected to the top of the axle 12 with the stops 22, 24 being mounted on the top of the axle 12. By this construction, the indicating device 30 will always indicate less strain than when the stops 22, 24 are not contacted and the top mounted strain gauge 28 will be protected from the environment. This is a conservative condition which is usable to prevent operation of the lift truck 10 with a greater load moment when the axle 12 is against a stop 22, 24 than when the axle 12 is not against a stop 22, 24.

Operation of the method of the present invention is illustrated with reference to FIG. 4 and the following numerical example. For the lift truck 10, W, T, and H are known quantities; X is dependent upon H and T; and $F_S$, $F_L$ and $F_R$ are dependent upon W. Where $W = 10,000$ (44,500N), $T = 60$ (1.524m) and $H = 15$ (0.381m), then $X = 20$ (0.508m). X may also be determined graphically by constructing the moment diagram of FIG. 4 in which the t-axis represents distance and the vertical axis represents moment.

When the stops 22, 24 are not contacted, $F_S = 0$ and the moment at $t = t/2$ is WT/4 or 150,000 (667,500N). When the left stop 22 is contacted hard enough that $F_S = W$ the moment at $T = H$ is $WH/2 + (F_SH/2T)(T-2H) = 112,500$ (495,625N). The point at which the moment diagrams for $F_S = 0$ and $F_S = W$ intersect is X. The strain gauge 28 is located inboard of X, preferably between X and the center point 26 of the axle 12.

Thus, an operator desiring to sense a change in the deflection of the axle 12 of the lift truck 12 attaches the strain gauge 28 to the axle 12 near one of the stops 22, 24. The strain gauge 28 is longitudinally located inboard of "X". X is the longitudinal location at which the axle bending movment is substantially independent of the force exerted by the stop member on the axle 12. The strain gauge 28 produces a signal in response to axle deflection which is received by the indicating unit 30 to give the operator a visual or audible indication of the change in deflection. The signal is useful to stop the lift truck 10 from lifting or tilting forward or to completely stop the lift truck 10 when the axle 12 deflects a preselected amount and prevent longitudinal instability.

Other aspects, objects and advantages will become apparent from a study of the specification, drawings and appended claims.

The embodiments of the invention in which an exclusive property or privilege is claimed are defined as follows:

1. In a method for sensing a change in deflection of a pivotal axle due to laod, said axle having first and second ends and being connected to a frame, said first and second ends being connected to first and second wheels, respectively, with the pivotal movement of said axle toward the frame being limited by a stop member connected to one of the axle and frame, the improvement comprising:

attaching a deflection sensing means to a preselected side of the axle about a preselected longitudinal location relative to the length of the axle, said preselected location being defined by the equation:

$$X = 2TH/2H+T$$

wherein $x =$ the longitudinal location at which the axle deflection is substantially independent of the force exerted by the stop member on the axle measured inwardly from the center of one of the wheels, $T = $ the distance between the centers of the wheels, and $H = $ the distance between the first wheel center and the center of the stop member; and connecting an indicating device to the deflection sensing means.

2. A method, as set forth in claim 1, wherein the deflection sensing means is located inboard of the preselected longitudinal location.

3. A method, as set forth in claim 1, wherein the deflection sensing means is located between the preselected longitudinal location and the center of the axle.

4. A method, as set forth in claim 1, wherein the deflection sensing means comprises a strain gauge.

5. A method, as set forth in claim 1, wherein the deflection sensing means is attached on the top side of the axle.

* * * * *